Dec. 31, 1940.  O. K. KJOLSETH  2,227,140
OSCILLATION RESTRAINT DEVICE
Filed Jan. 3, 1940  2 Sheets-Sheet 1
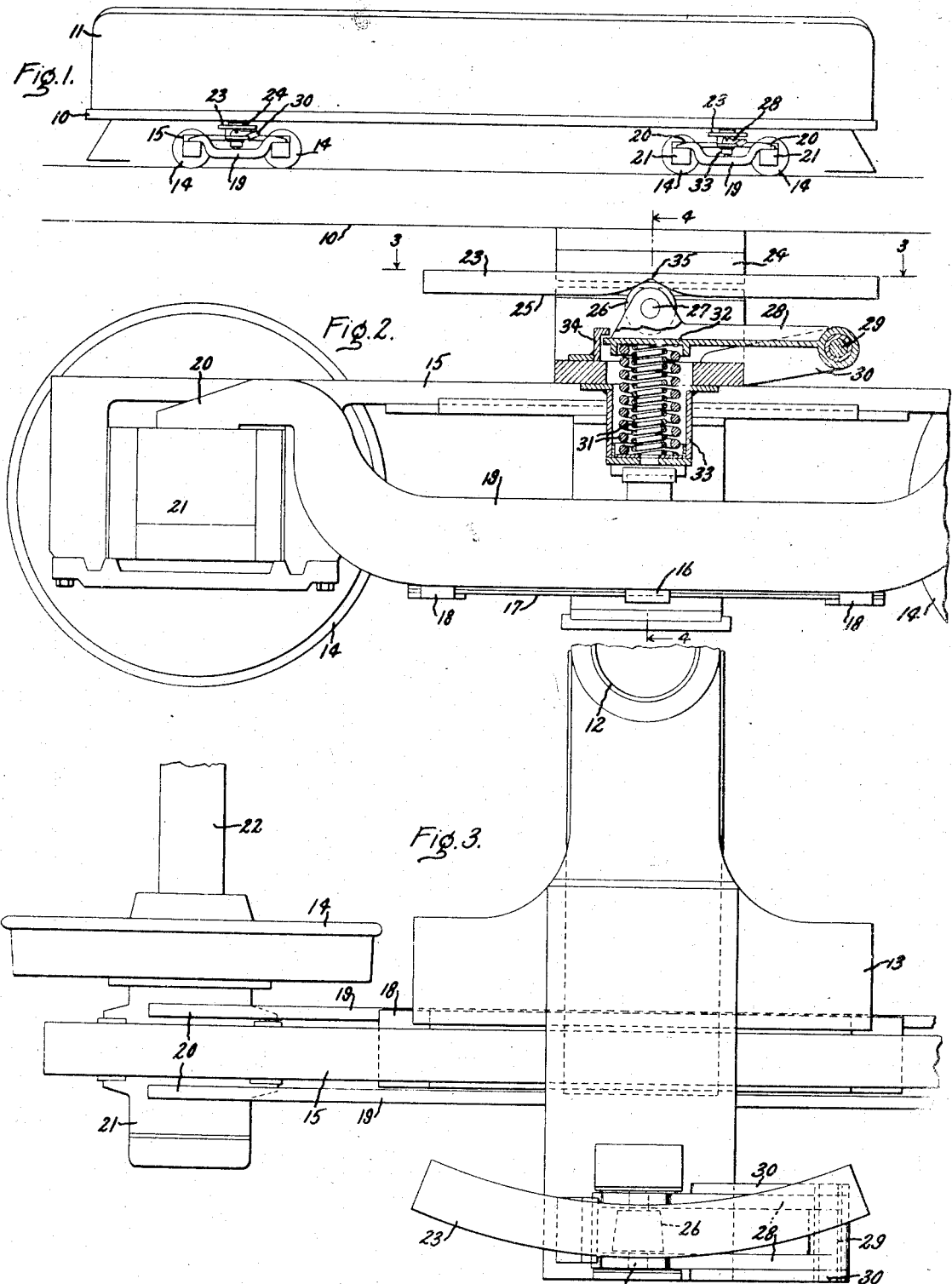
Inventor:
Ole K. Kjolseth,
by Harry E. Dunham
His Attorney.

Dec. 31, 1940.    O. K. KJOLSETH    2,227,140
OSCILLATION RESTRAINT DEVICE
Filed Jan. 3, 1940    2 Sheets-Sheet 2
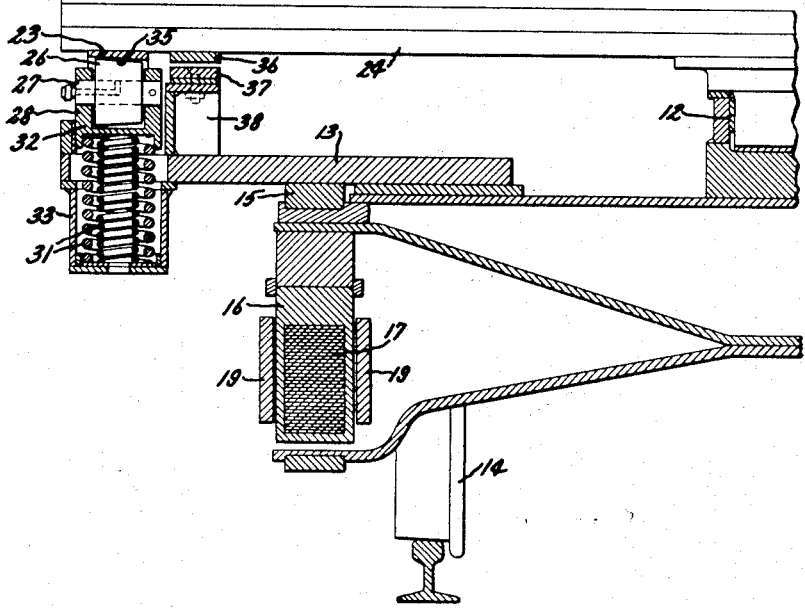
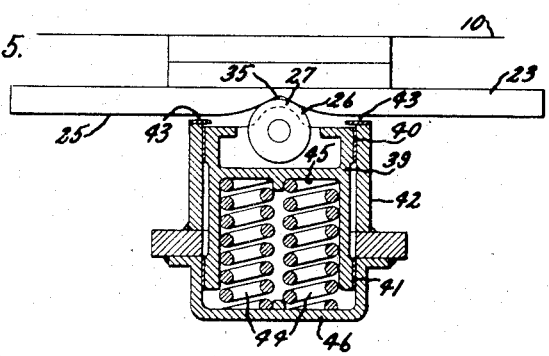
Inventor:
Ole K. Kjolseth,
by Harry E. Dunham
His Attorney.

Patented Dec. 31, 1940

2,227,140

UNITED STATES PATENT OFFICE 2,227,140

OSCILLATION RESTRAINT DEVICE

Ole K. Kjolseth, Erie, Pa., assignor to General Electric Company, a corporation of New York Application January 3, 1940, Serial No. 312,187

3 Claims. (Cl. 105—199)

My invention relates to oscillation restraint or centering devices for railway trucks for restraining small oscillatory movements or displacements of the trucks with respect to the vehicle frame to prevent nosing of the vehicle and for permitting free pivotal movement therebetween when the vehicle traverses a curve in the track. In a railway vehicle, the vehicle frame usually is supported on a plurality of trucks and some arrangement generally is provided for permitting a limited amount of lateral pivotal movement of the truck frames relative to the vehicle frame in order to minimize the pressure exerted by the flanges of the wheels against the rails when the vehicle is passing around a curve. It is desirable that lateral oscillations of the trucks and nosing of the vehicle should be restrained under normal operating conditions and that the truck should be maintained in substantial alignment with the vehicle on tangent track, but the centering force should act only for small lateral pivotal displacements, and when the vehicle enters a curve in the track, the lateral pivoting of the truck should not be restrained. It is desirable, therefore, that the oscillation or nosing restraint device should exert a predetermined restraining force for a predetermined small range of relative movement or displacement from longitudinal alignment of the trucks and the vehicle frame, and substantially no restraining force for any further relative movement or displacement therebetween.

An object of my invention is to provide an improved oscillation or nosing restraint device which will resiliently center vehicle trucks relative to the vehicle frame and restrain small oscillations of the trucks.

Another object of my invention is to provide an improved railway vehicle side bearing arranged to restrain oscillatory movements between a supporting truck and the vehicle frame.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings, Fig. 1 is a side elevation of a railway vehicle embodying my invention; Fig. 2 is an enlarged elevational view of a part of one of the trucks and the vehicle frame shown in Fig. 1 illustrating in partial section an embodiment of my improved restraint device; Fig. 3 is a plan view of a part of the truck and the restraint device as viewed along line 3—3 of Fig. 2; Fig. 4 is an elevation taken along line 4—4 of Fig. 2, partly in section; and Fig. 5 is a side elevational view, partly in section, of another embodiment of my improved oscillation restraint device.

Referring to the drawings, an electric locomotive having a supporting frame 10 and a superstructure 11 is pivotally supported by center bearings 12 on trucks having frames 13. To facilitate traversing curves in the track, these center bearings 12 provide a pivotal support for the vehicle frame, so that the truck frames and the vehicle frame may pivot laterally with respect to each other. Irregularities in the track tend to produce oscillations of the trucks about the center bearings 12, and it is desirable that these oscillations should be restrained in order to prevent nosing of the vehicle and to provide a smooth operation thereof. These oscillations of the trucks can be greatly reduced or limited by providing an oscillation or nosing restraint device which will maintain substantial alignment of the trucks and the vehicle frame on tangent track. It is desirable that the restraint device should not restrain relative pivotal movement between the frames of the trucks and the vehicle beyond a predetermined range, as it is necessary that the trucks pivot about their connections to the vehicle frame when the vehicle traverses a curve in the track.

The center bearings 12 are adapted to transmit vertical forces between the vehicle frame 10 and supporting wheels 14 through a resilient support of the truck frames 13. This resilient support includes truck side frames 15 which engage spring straps 16 arranged about the central portion of leaf springs 17. These springs are supported on spring seats 18 secured to longitudinally extending equalizers 19, the ends 20 of which rest upon the upper surface of journal boxes 21 arranged about journal bearings for axles 22 on which the wheels 14 are mounted.

In order to prevent oscillation of the trucks about the center bearings 12 and to prevent nosing of the vehicle, as explained above, I provide a cam 23 which is secured adjacent the outer side of the frame 10 to a transversely extending frame member 24. This cam is provided with a cam surface 25 on the under side thereof, which is substantially a plane surface over about three-fourths of the distance from each end towards the center of the cam, and the remaining cam surface is of increasing curvature towards the center of the cam to provide a substantially V- notch portion. A roller cam follower 26 is adapted to engage this cam surface, and is rotatably mounted upon a pin 27 supported by a follower arm 28 which is pivotally supported by a pivot pin 29 on supporting bracket arms 30. The follower roller 26 is resiliently biased into engagement with the cam surface 25 by springs 31 which engage a spring seat 32 formed on the under side of the follower arm 28 substantially below the mounting of the roller 26 upon the follower arm. These biasing springs 31 are arranged within a housing 33 which is secured to the truck frame 13, and a guard 34 is arranged over the outer edge of the follower arm 28 to limit the outward movement thereof. In order to maintain engagement between the follower roller 26 and the cam 23 when the railway vehicle is on a curve in the track, the cam 23 is curved on an arc having the center thereof at the center of the center bearing 12 to provide a track on which the roller 26 may travel under these conditions.

When the railway vehicle passes over irregularities in the track which tend to cause the trucks to oscillate about the pivotal connection to the vehicle frame through the center bearing 12, the springs 31 bias the follower roller 26 into engagement with the curved portion of the cam surface 25 and exert a restraining force tending to maintain the central portion 35 of the cam centered above the roller 26. Any relative movement therebetween will cause the roller 26 to pass over the curved portion of the cam surface on either side of the center 35, thereby moving the outer end of the follower arm 28 downwardly and compressing the biasing springs 31. This compression of the biasing springs 31 results in an increased restraining force being exerted upon the follower arm 28 in urging the roller 26 into engagement with the cam surface, and further tends to center the cam with respect to the follower roller. When the locomotive enters a curve, the locomotive frame 10 and the cam 23 tend to be displaced with respect to the roller 26, so that the roller 26 is moved out of engagement with the curved portion of the cam surface 25 and engages the flat plane track surface of the cam and rolls over this plane surface with substantially no restraining or centering force. In this manner, the oscillation restraint device provides a variable restraining or centering force as the roller 26 passes from the center 35 over the curved surface towards the plane surface of the cam, providing an initial centering or oscillation restraining force for a predetermined relative movement between the vehicle frame 10 and the truck frame and provides substantially no restraining force for another predetermined relative movement therebetween, as the roller 26 engages the plane surface of the cam 23. This arrangement of the oscillation restraint device adjacent the outer sides of the vehicle frame and the trunk also provides a resilient side bearing, as any relative vertical movement between the vehicle frame and the truck frame transmits a force between the cam 23 and the roller 26 which tends to compress the biasing springs 31, thereby damping such relative vertical movements between these frames. In order to limit definitely the relative vertical movement between the vehicle frame and the truck frame, I provide a rigid side bearing 36 secured to the transversely extending vehicle frame member 24 which is adapted to engage a complementary side bearing 37 spaced therefrom and mounted upon a supporting bracket 38 secured to the truck frame 13 adjacent the outer end thereof.

In Fig. 5, I have shown another modification of the arrangement shown in Figs. 1 to 4, inclusive, wherein the cam 23 is formed and arranged as in the other embodiment shown in these other figures of the drawings. The follower, however, is not provided with a pivoted follower arm, but includes a substantially cylindrical follower roller 26 rotatably supported by a pin 27 upon the upper side of a follower piston 39. This piston is provided with bearing surfaces 40 and 41 arranged adjacent the upper and lower edges thereof which are adapted to engage complementary surfaces on the inner side of a housing 42. Limit stop flanges 43 are arranged over the upper end of the housing 42 and are adapted to limit the upward movement of the piston 39 with respect to the housing. As in the arrangement shown in the other figures of the drawings, the follower roller 26 is resiliently biased into engagement with the cam surface 25 by compression biasing springs 44, which are arranged to engage a spring seat 45 formed within the piston 39. These springs are held under compression between the spring seat 45 and the lower end 46 of the housing 42. The operation of this biasing device is similar to that of the other figures, and exerts a maximum centering or oscillation restraining force when the follower roller 26 is centered with respect to the central portion 35 of the curved cam surface. This restraining force decreases as the roller passes over the cam surface towards either end thereof for a predetermined relative movement between the cam and the follower and produces substantially no restraining force for any further movement therebetween as the roller passes over the plane portion of the cam surface 25 on either side of the curved portion thereof.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A side bearing and oscillation restraint device for a railway vehicle including an arcuate cam mounted on a member of said vehicle adjacent an outer side thereof, another member of said vehicle relatively movable with respect to said first-mentioned member, a cam follower, an arm pivotally mounted on said other member and arranged to support said follower, means for resiliently biasing said follower into engagement with said cam, and means including a cam surface of varying curvature on said cam arranged in engagement with said follower for providing an initial restraining force against relative movement between said members for a predetermined relative movement and for providing substantially no restraining force for any further relative movement therebetween.

2. A side bearing and oscillation restraint device for a railway vehicle including a cam follower provided with a substantially cylindrical follower roller, means including a longitudinally extending arm pivotally mounted on a member of said vehicle adjacent an outer side thereof for supporting said follower roller in vertically movable position, another member of said vehicle relatively movable with respect to said first-mentioned member, and means including a cam having a curved surface secured to said other member adjacent an outer side of said vehicle and arranged to engage said follower roller for providing an initial restraining force against relative movement between said members for predetermined relative movement and for providing substantially no restraining force for any further relative movement therebetween, said curved surface being formed to provide a maximum restraining force when said cam and follower roller are in centered relation and to provide a gradually decreasing restraining force for relative movement therebetween from said centered relation to a position providing substantially no restraining force therebetween.

3. A locomotive or a car having a frame, a truck having a frame providing a pivotal support for said locomotive or car frame, a cam carried by one of said frames adjacent an outer side thereof, a follower having an arm extending longitudinally of said frames and pivotally carried by the other of said frames from said cam supporting frame, means for resiliently biasing said follower into engagement with said cam, and means including a cam surface of varying curvature on said cam for providing a variable restraining force to relative pivotal movement between said truck and said frame.

OLE K. KJOLSETH.